United States Patent
Himmel et al.

(10) Patent No.: US 6,751,306 B2
(45) Date of Patent: Jun. 15, 2004

(54) LOCAL ON-HOLD INFORMATION SERVICE WITH USER-CONTROLLED PERSONALIZED MENU

(75) Inventors: Maria Azua Himmel, Yorktown Heights, NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 09/826,755

(22) Filed: Apr. 5, 2001

(65) Prior Publication Data

US 2002/0146106 A1 Oct. 10, 2002

(51) Int. Cl.[7] .................... H04M 3/42; H04M 3/428; H04M 3/487; H04M 3/58
(52) U.S. Cl. .................. 379/201.02; 379/215.01; 379/393; 379/901
(58) Field of Search ................ 379/201.01, 201.02, 379/215.01, 265.09, 393, 901

(56) References Cited

U.S. PATENT DOCUMENTS

| | | | |
|---|---|---|---|
| 5,444,774 A | 8/1995 | Friedes | 379/266.01 |
| 5,875,231 A | 2/1999 | Farfan et al. | 379/67.1 |
| 5,920,616 A | 7/1999 | Hazenfield | 379/162 |
| 5,946,378 A | 8/1999 | Farfan | 379/88.23 |
| 6,014,439 A | 1/2000 | Walker et al. | 379/266.01 |
| 6,208,729 B1 * | 3/2001 | Agraharam et al. | 379/215.01 |
| 6,324,265 B1 * | 11/2001 | Christie et al. | 379/88.23 |

* cited by examiner

Primary Examiner—Harry S. Hong
(74) Attorney, Agent, or Firm—Duke W. Yee; Jeffrey S. LaBaw; Stephen R. Tkacs (57) ABSTRACT

A telephone user sets up a "personalized" menu identifying a set of information options from which he or she desires to select when placed on-hold in a telephone system. The user's personal preferences are then saved. When the party later makes a call to a telephone system or is called, and then is placed on-hold, the party's telephone service provider or local equipment accesses the user's personalized menu and offers the one or more information options as defined in the menu. In an illustrative embodiment, the personalized menu options are voiced over the telephone line and the user then makes selections using keypad (i.e. DTMF signaling) or voice input. A response may be interrupted to make another menu selection, or to repeat the current response. If the response being played has not completed when the other party returns, that response is suspended and may be completed when the user is placed back on hold or the call is completed.

33 Claims, 4 Drawing Sheets

LOCAL ON-HOLD INFORMATION SERVICE WITH USER-CONTROLLED PERSONALIZED MENU

BACKGROUND OF THE INVENTION

1. Technical Field

The present invention relates generally to telephone call on-hold information services and, in particular to techniques for enabling a caller to personalize a menu of information services that are made available when the caller is put on-hold in a telephone system.

2. Description of Related Art

It is well known in the prior art to provide information to a caller who is placed on-hold in a telephone system. Typical call-on-hold systems provide music or other audio messages to the caller while he or she waits for the called party to answer the call. These types of systems are in widespread use in telephone call or contact centers. A "call center" is an organization of people, telecommunications equipment and management software that efficiently handles telephone-based customer contact. A representative call center on-hold information service is described in U.S. Pat. No. 6,014,439 to Walker et al. This patent teaches a system for entertaining a caller placed in a queue of a call center that allows the caller to access a plurality of entertainment options while on-hold. The entertainment options permit the caller who is on-hold to place a call to a third party, or to access one or more premium entertainment services. In this system, a private branch exchange/automatic call distributor (PBX/ACD) receives the calls destined for the call center and queues the calls when an appropriate call handling agent is not available. An interactive voice response unit (IVR) prompts a caller for specific information and forwards the collected information to the PBX/ACD. The IVR provides the caller with a menu of available information options, which can be accessed by the caller. After a selection is made, the PBX/ACD establishes a connection between the caller and the selected entertainment service.

The prior art provides other examples of telephone on-hold information services outside of the call center environment. Representative patents includes U.S. Pat. Nos. 5,875,231 and 5,946,378 to Farfan et al. These patents describe an on-hold telephone service that allows a subscriber to place a call on-hold and to make one or more information services available to the on-hold party. The on-hold service can be implemented on a central office switch or on an enhanced services platform connected to the switch. The on-hold service is accessed by the subscriber to the service through a transfer function that causes the call to be maintained by the on-hold service. The party that is placed on-hold by the subscriber (i.e. the called party) can then interactively acquire the various types of information available from the service, e.g., news, weather, stock market information, and the like. The subscriber to the service can send a message to the on-hold party to cause the on-hold party to selectively reconnect to the subscriber upon receipt of the message or, later, when the on-hold party is ready to do so. Other "on-hold" telephone systems are described in U.S. Pat. Nos. 5,444,774 and 5,920,616.

While "on-hold" systems such as described above are useful, the on-hold party has only limited control over the content he or she may select. That content is usually predetermined by the system provider. As a consequence, the on-hold party is often forced to listen to advertising or other informational messages that are likely to be of little interest to the user, who, in effect, is held hostage on the telephone line waiting for the called party. Systems like those disclosed in the '439 patent to Walker et al. provide somewhat more flexibility in that they allow the on-hold party more choices, however, few callers will want to make a third party call or will want to pay for premium entertainment services as is contemplated thereby. The present invention addresses this deficiency in known on-hold information services.

SUMMARY OF THE INVENTION

A telephone user sets up a "personalized" menu identifying a set of information options from which he or she desires to select when placed on-hold in a telephone system. The user's personal preferences are then saved. When the user later makes a call to a telephone system or is called, then is placed on-hold, the user's local telephone service provider or alternatively the user's own telephone equipment detects that the user is on hold. The user's local provider or equipment then suspends the call, accesses the user's personalized menu and offers the one or more information options as defined in the menu. In an illustrative embodiment, the personalized menu options are voiced over the telephone line and the user then makes selections using keypad (i.e. DTMF signaling) or voice input. A response may be interrupted to make another menu selection, or to repeat the current response. When the other party returns, the user's local provider or equipment detects that the returning party has returned, and resumes the call. If the response being played has not completed when the returning party returns, that response is suspended and may be completed when the user is placed back on-hold or the call is completed.

According to a further technical advantage of the invention, the particular options set forth in the user's menu may be reordered or prioritized from time-to-time depending on selections made by the user during prior "on-hold" sessions. This creates an "active" menu that more accurately reflects the user's preferences as the on-hold system is utilized. In a representative embodiment, more frequently selected items in the menu are played before less frequently selected items.

According to yet another technical advantage of the invention, the user is allowed to select his or her preferences, regardless of who (or what) the other party is.

The foregoing has outlined some of the more pertinent objects and features of the present invention. These objects and features should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
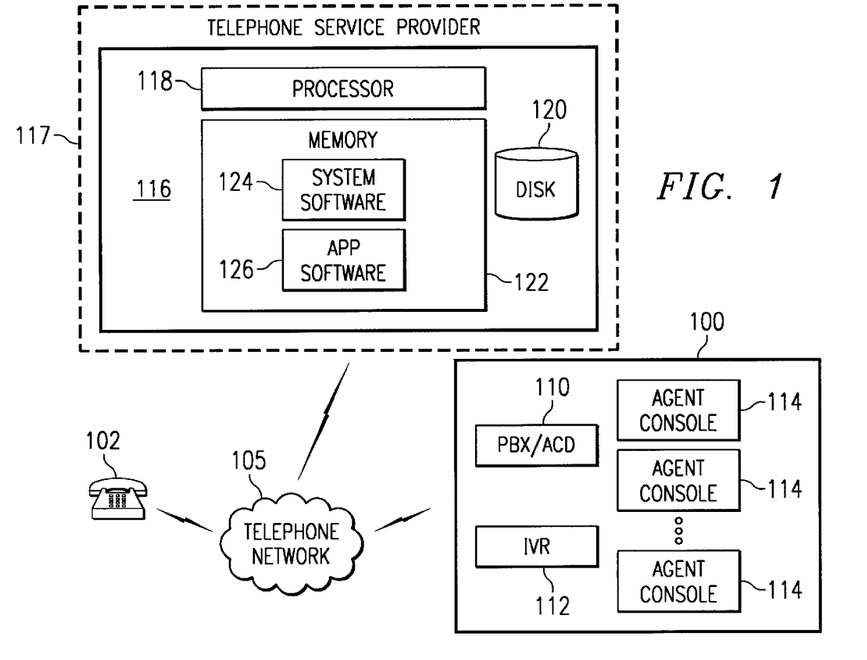
FIG. 1 is a block diagram of the basic architecture of a telephone system in which the present invention may be implemented.

FIG. 1 is an illustrative network call or contact center environment in which the present invention may be implemented. In this environment, a caller (the "on-hold" party) at station set 102 waits in a queue of a call center. A station set may be embodied as a conventional wireline telephone, a wireless phone, a personal computer or other pervasive computing device configured with appropriate telephony software and Internet connectivity, or the like. A call is routed via telephone network 105 to the call center 100. The call center 100 may include a PBX switch 110 with automatic call distribution capability. The PBX 110 may have an interactive voice response unit (IVR) 112 associated therewith. The PBX 110 and IVR 112 are well-known in the telephony art. The PBX is a switching system designed to receive telephone calls destined for call center 100 and to queue those calls when a call handling agent is not available. The IVR 112 is a voice information system that provides call prompting and DTMF tone and voice command detection, among other conventional functionality. Call handling agents at the attendant consoles 114 handle the calls following transfer from the hold queues.

An on-hold information system 116 is embodied in equipment operated by the caller's telephone service provider 117. On-hold information system 116 comprises processor 118, disk storage 120, system memory 122, system software 124, and application software 126, among other conventional computer resources. According to the present invention, the on-hold information system 116 provides an on-hold party the option of receiving a personalized active menu of information options that may be selected by the on-hold party when the party is placed on-hold by the call center 100. Unlike the prior art, a menu preferably is defined by the on-hold party (as opposed to the system operator, a service provider, the "not-on-hold" party, or the like), and this menu may be modified from time-to-time as the on-hold party uses the on-hold information system 116 and associated service offering.

Although the on-hold information system 116 is illustrated as equipment associated with a telephone service provider, this is not a requirement of the present invention. One of ordinary skill in the art will appreciate that the inventive functionality may be built into the station set 102, into a standalone item of equipment (not shown) associated with station set 102, or into a PBX associated with station set 102. When the on-hold party's own equipment is used, the equipment may retrieve up-to-date information for delivery to the on-hold party from a remote server (not shown) in communication with the on-hold party's equipment through telephone network 105.

Moreover, the invention is not limited to use with a telephone call center; rather, the inventive caller-controlled menu functionality may be implemented to operate with any on-hold information service regardless of the telephony environment. The call center environment of FIG. 1 is merely illustrative.

Figure 2:
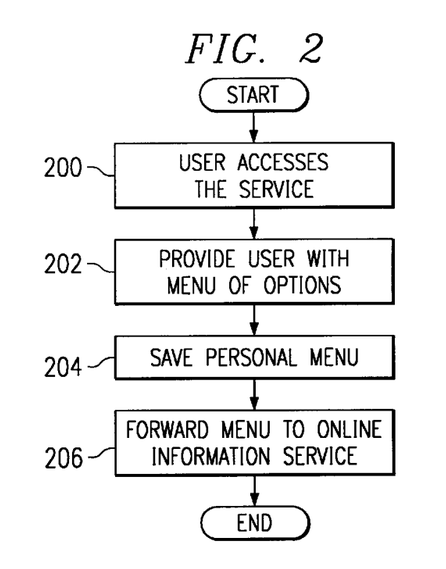
FIG. 2 is a flowchart illustrating a preferred technique by which a user registers a personalized on-hold information service menu.
Figure 3:
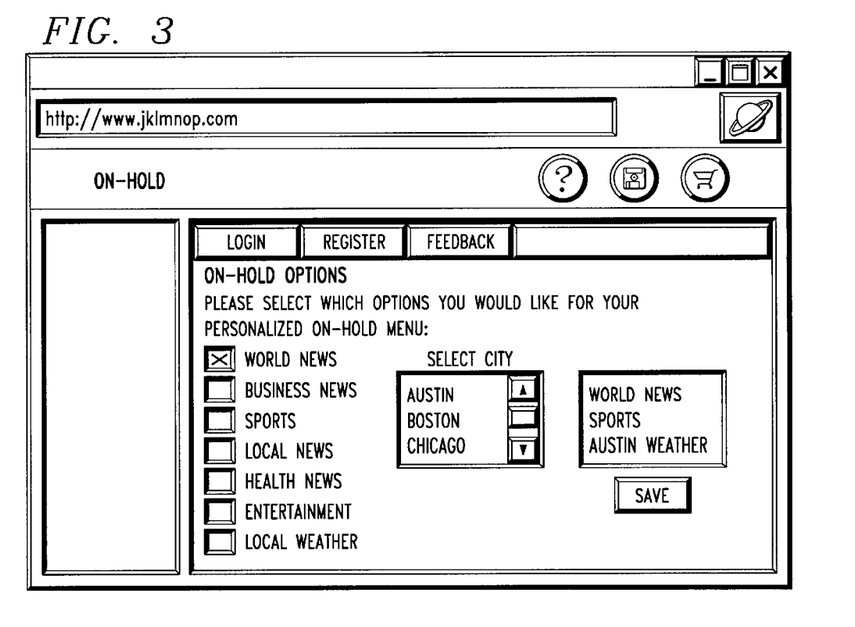
FIG. 3 is a representative web page at which a user may register his or her information option preferences to create a personalized active menu for use in the on-hold information service.

FIG. 2 is a flowchart of one illustrative method for registering a user to the on-hold information system. Typically, the registration (or "subscription") process is carried out off-line, i.e. before the user accesses the telephone call center and is placed within an on-hold queue. The routine begins at step 200 with the user accessing the information service to register his or her initial preferences for the on-hold active menu. One convenient technique is for the user to access a web page supported on a web server. An illustrative web page 300 is shown in FIG. 3. At step 202, the user is provided with a menu describing the various information options that may be selected. The web page 300 in FIG. 3 illustrates various options including, for example: world news, business news, sports, local news, health news, entertainment, local weather, and the like. Each option has an associated radio button that may be selected. Some options, e.g., local news or weather, have an associated listbox that may be selected so that the user may select a particular city. One of ordinary skill will appreciate that any type of convenient user interface dialog may be used to enable the user to select a set of options and thus personalize his or her "on-hold" menu. In this example, the user has defined a personalized menu comprising world news, sports, and Austin weather. At step 204, the user saves the personalized menu, e.g., by selecting a SAVE button in the dialog. The personalized menu is then saved or stored within the on-line information system and service at step 206 to complete the process.

The personalized menu may be built or defined by the user in any other convenient manner. Thus, for example, an on-hold party may become a subscriber to the on-hold information service by registering over the telephone. Alternatively, the user may define his or her personalized menu manually and forward the menu selections to the service provider. Generalizing, a given menu option is composed of a static prompt and a dynamic response. For example, the static prompt may be "Press 1 for my portfolio quotes" while the dynamic response would be the on-hold party's current portfolio quotes. The on-hold information system has access to the information sources that are identified in the set of menu options that may be selected by the user. These sources may or may not comprise part of the on-hold information system.

For instance, a user wishing to choose particular selections of music might select an album of music from an existing list of selections available from the service provider, the user might direct the service to download the music from an external source, such as an Internet site, or the user might simply upload his or her own music files (such as MP3 format music files) to the information service.

Figure 4:
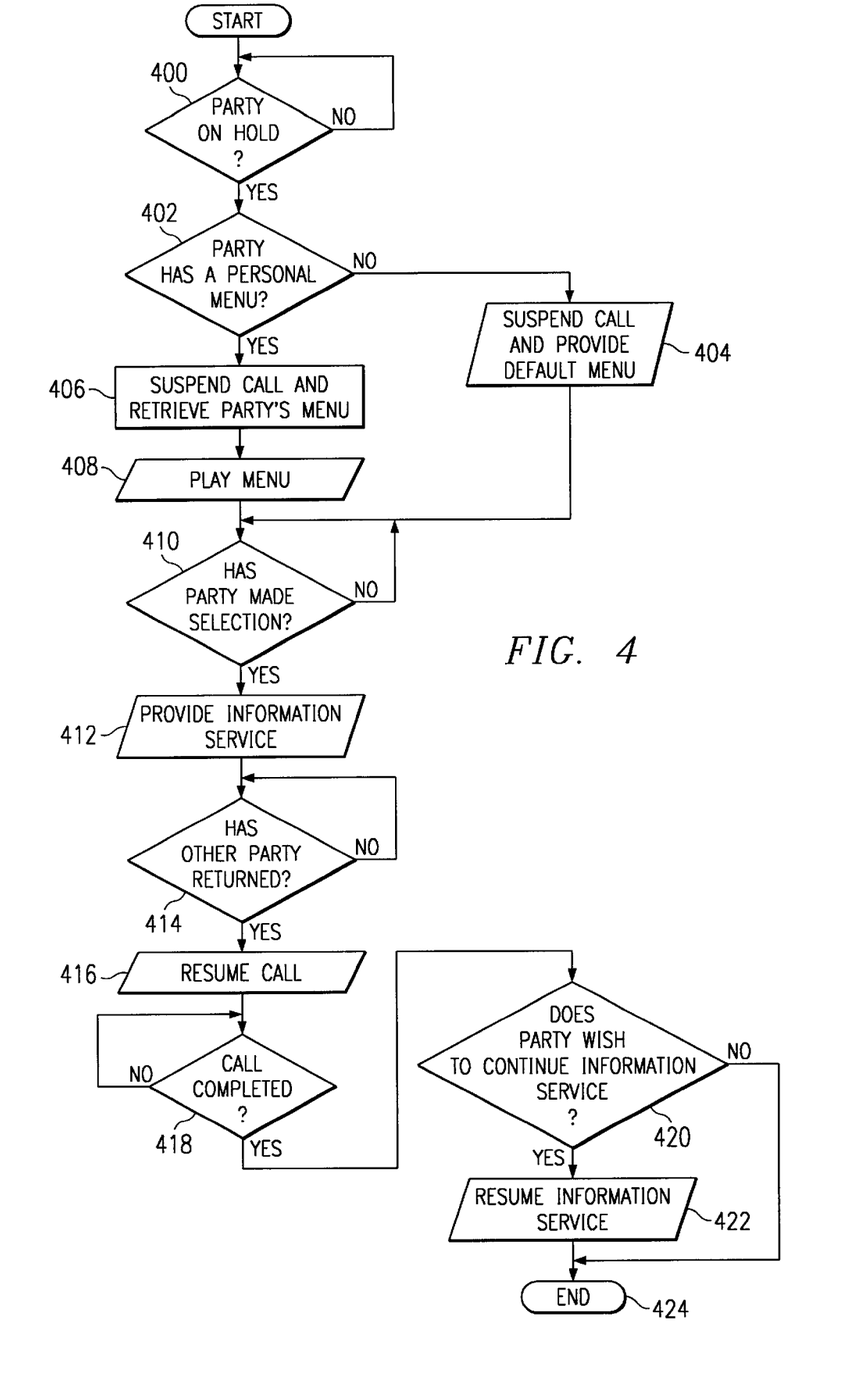
FIG. 4 is a flowchart illustrating the on-hold information service offering.

FIG. 4 illustrates the operation of the on-hold information system. The routine begins at step 400 to test whether a user has been placed on hold. When the outcome of the test at step 400 indicates that the user has been placed on hold, the routine continues at step 402 to determine whether the on-hold party has a personalized menu. If the outcome of the test at step 402 is negative, the routine continues at step 404 to suspend the call and provide the user with a default menu of on-hold information options, including an option to exit the on-hold information system and resume the on-hold call. Such a menu may be read in a manner like this, "You have five information choices. You may choose an option by pressing the appropriate number on your telephone keypad or by saying the number. For stock quotes, press or say 'one' . . . "

This set of information options may be "intelligent" in the sense that the list of menu options is tailored to the user as a function of the user's telephone number. This functionality may be provided by analyzing the user's telephone number using telephone switching information used by the telephone service provider to route the call through the telephone network, or as when the on-hold system is implemented in the caller's own equipment, through a priori knowledge of the caller's identity. The default menu provided in step 404 thus may include options (e.g., local weather, locale-based advertising, etc.) that may be relevant to the on-hold party given that the on-hold party is in a given locality.

In addition, advertisers or third-party service providers who seek to gain from having particular information services accessed by the user may pay the information service provider to have their services listed first or with greater frequency across users.

Rather than providing the default menu, the on-hold information system may default to a registration script to enable an unregistered or first-time user to register a personalized menu as he or she is waiting for the given call to be completed. In particular, once the user is placed on-hold, he or she may be invited to register for the service. If the user desires to create a personalized menu, he or she is prompted to select a set of information options which then become the user's personalized menu for the current call and, optionally, any of the user's future calls that are placed on-hold regardless of whom the caller calls or is called by.

If the outcome of the test at step 402 indicates that the on-hold party has previously stored a personalized menu, the routine continues at step 406 to suspend the call and retrieve the on-hold party's menu that was previously stored within the system. At step 408, the personalized menu is played to the on-hold party. A test is then performed at step 410 to determine whether the on-hold party has made a selection. If not, the routine cycles. If, however, the on-hold party has made a selection, the routine continues at step 412 to provide the information option. Typically, the option is provided as a voiceover on the telephone line. The voiceover may be a live radio broadcast or other information service that was pre-selected by the on-hold party as indicated within the party's personalized menu.

At step 414, a test is performed to determine whether the returning party has returned. If not, the routine cycles. When the outcome of the test at step 414 indicates the other (returning) party has returned, the on-hold party is connected to the returning party (e.g., a call handling agent). This is step 416. A test is then performed at step 418 to determine whether the call has been completed. If not, the routine continues to step 412 and cycles while the two parties communicate. If the outcome of the test at step 418 is positive, a test is performed at step 420 to determine if the on-hold party desires to continue with the information service. This test may be evaluated by providing a voice prompt to the on-hold party. The voice prompts may be provided, for example, using the IVR or some other voice prompting device. If the outcome of the test at step 420 is positive, the routine continues at step 422 to resume the information service, preferably at the point when the service offering was interrupted when the on-hold party was connected to the returning party. If, however, the on-hold party does not wish to return to the information service, the routine terminates at step 424. This completes the processing.

Figure 5:
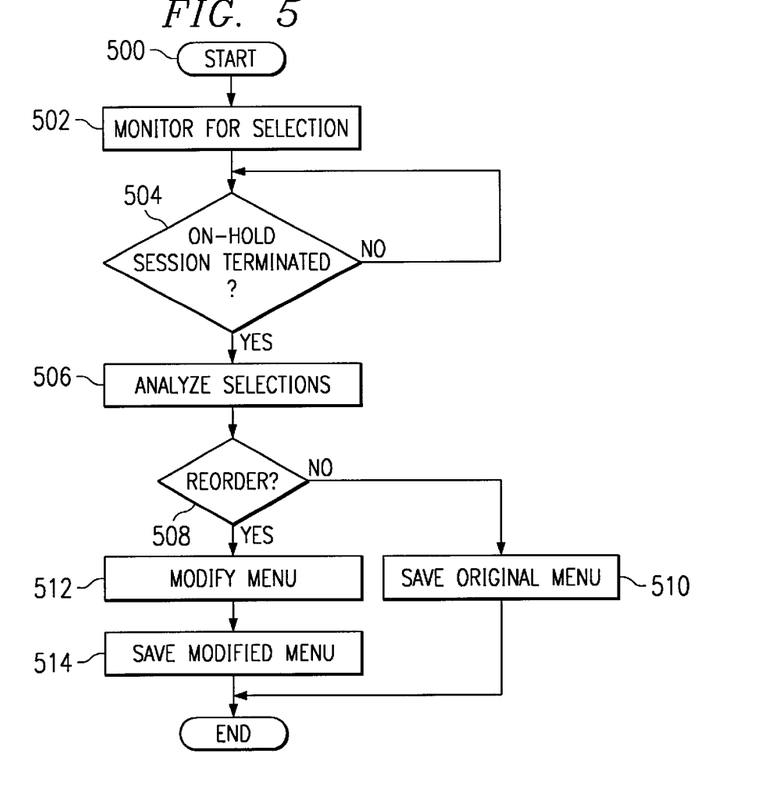
FIG. 5 is a flowchart illustrating a menu adjustment routine of the present invention.

The above-described processing, wherein the information service optionally is resumed when the call is completed, may also be a default operation when the on-hold party is again placed on-hold during the call. According to another technical advantage of the present invention, a user's personalized menu is modified from time-to-time as a result of interactivity with the menu. This functionality is illustrated in the flowchart of FIG. 5, which illustrates a menu adjustment routine.

The routine preferably operates concurrently with the menu option selection routine described above with respect to FIG. 4. The menu adjustment routine begins at step 500 when the on-hold information system retrieves a user's personalized menu. At step 502, the routine monitors for a user's selection of a particular menu option. The routine then continues at step 504 to determine whether the particular on-hold session has been terminated (e.g., completely finished). If not, the routine cycles. If, however, the particular on-hold session has ended, the routine continues at step 506 to compare the user's selections during the session with prior selections that have been made from the menu. Any convenient correlation function may be used for this purpose. At step 508, a test is made to determine whether, as a result of the correlation, the user's personalized menu options should be reordered. If not, the routine branches to step 510 and saves the personalized menu unchanged. If, however, the result of the test at step 508 indicates that the menu should be modified, the routine continues at step 512 to modify the menu. Thus, for example, if the routine determines that a particular menu option (e.g., news about the stock market) is always selected by the user, the menu itself may be modified to list this option first when the menu is used in a future on-hold session. Of course, one of ordinary skill in the art will appreciate that the menu modifications will depend on the particular correlation function used by the routine as well as how often the user is placed on-hold. As more data is gathered, the menu choices may be conveniently altered to provide more relevant choices for the particular user. Preferably, more frequently selected items are prioritized over less frequently selected items. Returning now back to FIG. 5, after step 512, the modified menu is saved for future use at step 514. This completes the processing.

If desired, the personalized menu may be generated "on-the-fly" as the on-hold party is placed on-hold as a result of prior selections made by the user or other on-hold parties.

Figure 6:
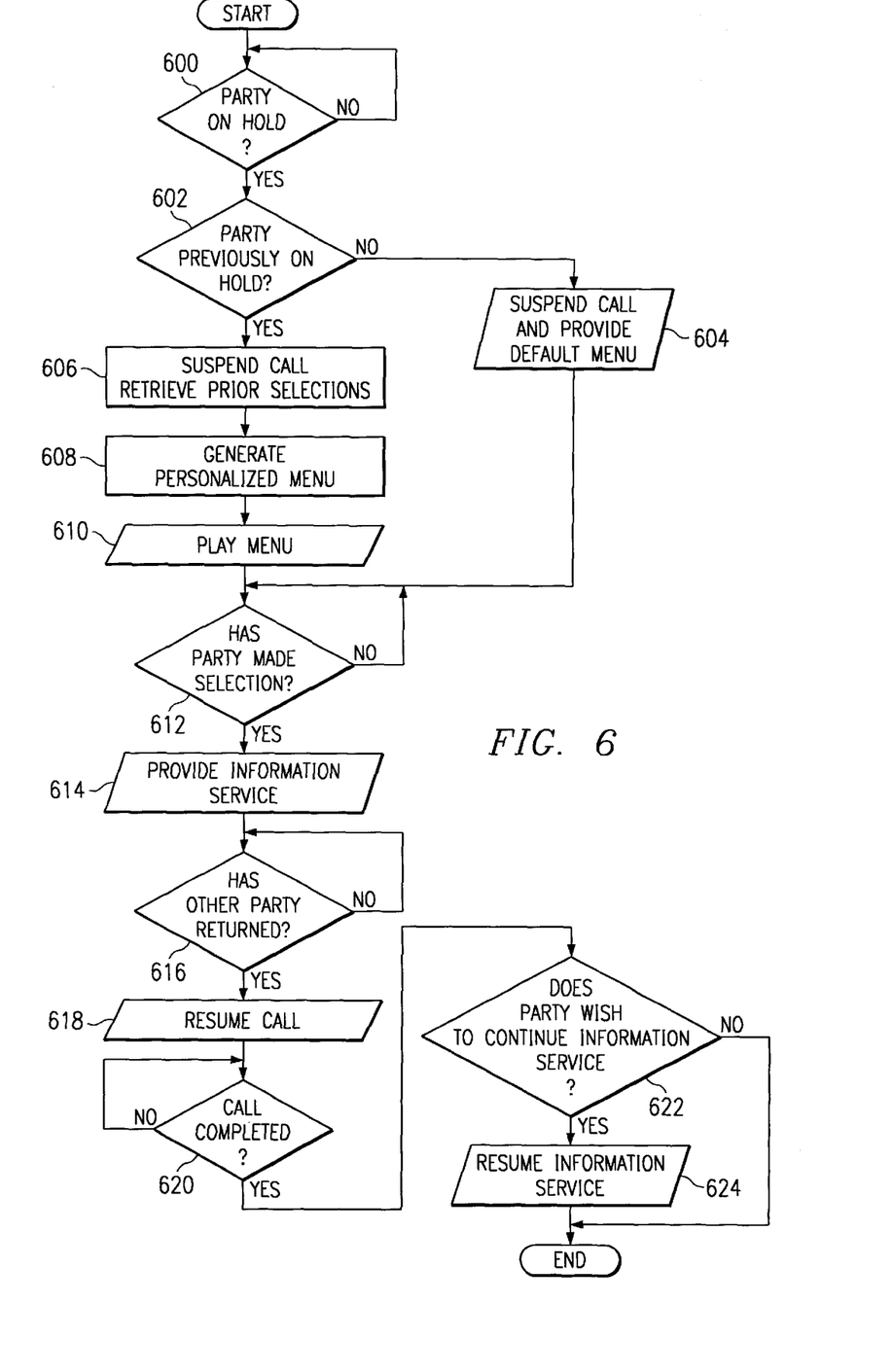
FIG. 6 is a flowchart illustrating a technique for generating a personalized menu as a function of a user profile or other identifying data.

FIG. 6 is a flowchart illustrating this technique, which presumes that a database of each user's prior on-hold menu selections (or some portion thereof) has been saved. The routine begins at step 600 when a particular user is placed on-hold. At step 602, a test is performed to determine whether the user has previously been on-hold. If not, the routine branches to step 604, suspends the call, which has been placed on hold, and returns a default menu, optionally based on the user's telephone number. If, however, the user has previously been on-hold, the routine continues at step 606, suspends the call, and retrieves from the database the on-hold party's prior on-hold selections. From these selections, the routine continues at step 608 to generate a personalized menu for the user. As with the default menu, this generated menu may be composed and placed in order so as to favor paying advertisers or third-party service providers. This menu is then played to the on-hold party at step 610. At step 612, a test is performed to determine if the on-hold party has made a selection. If not, the routine cycles. Once a selection is made, the routine continues at step 614 to provide the information service. At step 616, a test is performed to determine whether the returning party has returned. If not, the routine cycles. When the outcome of the test at step 616 indicates the returning party has returned, the on-hold party is connected to the returning party (e.g., a call handling agent). This is step 618. A test is then performed at step 620 to determine whether the call has been completed. If not, the routine cycles. If the outcome of the test at step 620 is positive, a test is performed at step 622 to determine if the on-hold party desires to continue with the information service. If the outcome of the test at step 622 is positive, the routine continues at step 624 to resume the information service, preferably at the point when the service offering was interrupted when the on-hold party was connected to the returning party. If, however, the on-hold party does not wish to return to the information service, the routine terminates. This completes the processing.

To properly suspend and resume calls as needed, and to provide an on-hold party with the option of returning to the on-hold information service even after completing call, the on-hold information service preferably maintains status information indicating whether a particular on-hold party is on-hold or otherwise connected to the returning party. Any convenient data structure (e.g., an array, a linked list, or the like) may be used for this purpose. When a call is received and the on-hold party is placed on-hold, the returning party's PBX (or other switching system) sends an "on-hold" packet to the on-hold information service. When the returning party returns, an "off-hold" packet is sent to the on-hold information service. Alternatively, the information service may analyze the telephone signal between the two parties to determine the call status, by detecting, for instance, periods of inactivity.

The on-hold information service provides numerous advantages over the prior art. With the present invention, a user is allowed to select options that are personally relevant when placed on-hold in a telephone system. By defining the personalized menu in advance, the user knows that he or she will be provided with desirable information in the event of an on-hold situation. As described above, the user can select from his or her own personalized active menu of options, which provides useful information, whenever the user is placed on-hold. While on-hold during a telecommunications session, the user can continue selecting useful menu options until the call is eventually answered, and he or she can elect to resume the on-hold information service even after the call is completed. The service provider saves the user's prior selections in a profile that may then be used to determine which menu options are offered to the user during subsequent on-hold sessions.

The inventive on-hold information service takes advantage of existing technology. Conventional IVR devices may be used to provide voiceover prompts. Conventional voice recognition systems and devices may be used to recognize control commands issued by an on-hold party. The inventive routines preferably comprise computer software routines that may be written in any convenient programming language (e.g., Java, C++, or the like) for any convenient hardware and operating system platform. As has been described, the inventive functionality may be provided as a standalone on-hold information service, or as an adjunct to an existing telephone switching system, PBX, PBX/ACD, or other information system, service, device or apparatus.

It is important to note that while the present invention has been described in the context of a fully functioning data processing system, those of ordinary skill in the art will appreciate that the software processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For instance, it is possible to have the on-hold information system of the present invention disabled by the user when communicating with particular parties, so that if there is a party that provides its own on-hold information system, the user can take advantage of it. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of using on-hold time during a telecommunications session, comprising the steps of:

responsive to detecting an on-hold status for a first party, determining whether the first party has been placed on-hold previously;

if the first party has been placed on-hold previously, retrieving a set of one or more information options that were selected by the first party while the first party was on-hold previously;

outputting to the first party a personalized menu including at least one information option selected by the first party while the first party was on-hold previously.

2. The method as described in claim 1 further including the step of prioritizing information options in the personalized menu as a function of selections made by the first party while the first party was on-hold previously.

3. The method as described in claim 1 further including the step of releasing the user from the on-hold status when a second party becomes available to communicate.

4. The method of using on hold time during a telecommunications session as described in claim 1, further comprising:

responsive to detecting an on-hold status for the first party, retrieving a menu of information options that has been defined by the first party;

responsive to detecting the on hold status, suspending, by means of an intervening system the telecommunications session;

outputting the menu to the first party; and receiving a selection of an information option in the personalized menu; and responsive to the selection of the information option, providing a selected information service corresponding to the selection to the first party.

5. The method as described in claim 4 further including the step of saving the first party's selection.

6. The method as described in claim 5 further including the step of modifying the menu of information options based on the first party's selections over a given number of on-hold sessions.

7. The method as described in claim 4 further including the steps of:
- interrupting the information service to resume the telecommunications session and connect the first party to a second party; and
- selectively resuming the information service upon completion of the call.

8. The method as described in claim 7 wherein the information service is resumed upon the first party's request.

9. The method as described in claim 4 wherein the menu of information options is defined by having the first party identify a set of desired information sources over a telephone.

10. The method as described in claim 4 further including the step of selectively connecting the first party to a second party as a function of a given information source selected by the first party.

11. The method as described in claim 4 further including the step of selectively delaying connection of the first party to a second party until a given information source selected by the first party is completed.

12. The method as described in claim 4, wherein the intervening system is associated with a telephone service provider.

13. The method as described in claim 4, wherein the intervening system is associated with equipment that is local to the first party.

14. A computer program product in a computer readable medium for use in a computer to provide an on-hold information service, comprising:
- instructions, responsive to detecting an on-hold status for a first party, for determining whether the first party has been placed on-hold previously;
- instructions for retrieving, if the first party has been placed on-hold previously, a set of one or more information options that were selected by the first party while the first party was on-hold previously; and
- instructions for outputting to the first party a personalized menu including at least one information option selected by the first party while the first party was on-hold previously.

15. The computer program product in a computer useable medium for use in a computer to provide an on hold information service as described in claim 14, further comprising:
- instructions for storing a personalized menu of information options for a user,
- instructions responsive to detection of an on hold status for the user for retrieving the personalized menu of information options;
- instructions responsive to detection of the on hold status for suspending, by means of an intervening system, a telecommunications session with a second party;
- instructions for outputting the personalized menu to the user; and
- instructions for receiving a selection of an information option in the personalized menu; and
- instructions, responsive to the selection of the information option, from the personalized menu for connecting the user's telephone station set to a selected information source corresponding to the selection while the user waits for the telecommunications session to be resumed.

16. The computer program product as described in claim 15 further including means for saving the user's information option selection.

17. The computer program product as described in claim 16 further including means for modifying the user's personalized menu of information options as a function of the user's information option selections over a plurality of on-hold sessions.

18. The computer program product as described in claim 15 wherein the station set is selected from a wireline telephone, a wireless telephone, a personal digital assistant (PDA), and a computer configured with telephone software and Internet connectivity.

19. The computer program product as described in claim 15 further including means for selectively connecting the user's station set to one of the second party and a third party as a function of the selected information option.

20. The computer program product as described in claim 15 further including means for selectively delaying resuming the telecommunications session until output of a selected information option is completed.

21. The computer program product as described in claim 15, wherein the intervening system is associated with a telephone service provider.

22. The computer program product as described in claim 15, wherein the intervening system is equipment that is local to the first party.

23. An on-hold information service connectable to a switching system, comprising:
- a processor;
- storage; and
- a computer program product executable by the processor, comprising:
  - a code for storing in the storage a personalized menu of information options for a user;
  - code, responsive to detecting an on-hold status for a first party, for determining whether the first party has been placed on-hold previously;
  - code for retrieving, if the first party has been placed on-hold previously, a set of one or more information options that were selected by the first party while the first party was on-hold previously;
  - code for outputting to the first party a personalized menu including at least one information option selected by the first party while the first party was on-hold previously.

24. The on-hold information service connectable to a switching system of claim 23, the computer program product further comprising:
- a processor;
- storage; and
- a computer program product executable by the processor, comprising:
  - code for storing in the storage a personalized menu of information options for a user;
  - code responsive to detection of an on hold status for the user for retrieving from the storage the personalized menu of information options; code responsive to the detection of the on hold status for suspending a telecommunications session associated with the user, code for outputting the personalized menu to the user; and
  - code for receiving a selection of an information in the personalized menu; and
  - code, responsive to the selection of the information option, from the personalized menu for connecting a telephone station set of the user to a selected information source corresponding to the selection while the user waits for the telecommunications session to be resumed.

25. The on-hold information service of claim 24, wherein the processor and computer program product are contained within equipment associated with the telephone station set.

26. The on-hold information service of claim 24, wherein the processor and computer program product are contained within a private branch exchange (PBX).

27. The on-hold information service of claim 24, wherein the processor and computer program product are contained within centralized equipment of a telephone service provider and wherein the centralized equipment is connected to the switching system.

28. The on-hold information service of claim 24, wherein the storage is incorporated into a remote server connected to the switching system.

29. A method of using on-hold time during a telecommunications session, comprising:

responsive to detecting an on-hold status for a first party, determining whether the first party has been placed on-hold during a prior call attempt;

if the first party has been placed on-hold during a prior call attempt, outputting to the first party a personalized menu including a set of one or more information options that were selected by the first party while the first party was on-hold during the prior call attempt;

releasing the first party from the on-hold status upon a given occurrence.

30. The method as described in claim 29 wherein the given occurrence is that a second party is available to communicate.

31. The method as described in claim 29 wherein the given occurrence is that an information service selected by the first party has completed.

32. The method as described in claim 29 wherein the given occurrence is that the first party has selected a given information option.

33. The A method as described in claim 1 of using on-hold time during a telecommunications session, comprising:

responsive to detecting an on-hold status for the first party, retrieving a menu of information options that has been defined by the firs party;

responsive to detecting the on-hold status, suspending by means of an intervening system, the telecommunications session;

outputting the menu to the firs party; and responsive to selection of an information option, providing a select information service to the firs party,     wherein the menu of information options is defined by having the first party identify a set of information sources at a web server.

\* \* \* \* \*

UNITED STATES PATENT AND TRADEMARK OFFICE
CERTIFICATE OF CORRECTION

PATENT NO.     : 6,751,306 B2
DATED          : June 15, 2004
INVENTOR(S)    : Himmel et al.

It is certified that error appears in the above-identified patent and that said Letters Patent is hereby corrected as shown below:

Column 8,
Lines 47-48, after "method" delete "of using on hold time during a telecommunications session".
Lines 51-57, delete
"responsive to detecting an on-hold status for the first party, retrieving a menu of information options that has been defined by the first party;
responsive to detecting the on hold status, suspending, by means of an intervening system, the telecommunications session;
outputting the menu to the first party and".

Column 9,
Lines 42-44, after "product" delete "in a computer useable medium for use in a computer to provide an on hold information service".
Lines 46-55, delete
"instructions for storing a personalized menu of information options for a user;
instructions responsive to detection of an on hold status for the user for retrieving the personalized menu of information options;
instructions responsive to detection of the on hold status for suspending, by means of an intervening system, a telecommunications session with a second party;
instructions for outputting the personalized menu to the user; and".
Line 59, after "option," delete "from the personalized menu".

Column 10,
Line 31, before "code" delete "a".
Lines 47-59, delete
"a processor;
storage; and
a computer program product executable by the processor, comprising:
code for storing in the storage a personalized menu of information options for a user;
code responsive to detection of an on hold status for the user for retrieving from the storage the personalized menu of information options; code responsive to the detection of the on hold status for suspending a telecommunications session associated with the user, code for outputting the personalized menu to the user, and".
Line 60, after "information" insert -- option --.
Line 63, after "option," delete "from the personalized menu".

UNITED STATES PATENT AND TRADEMARK OFFICE
CERTIFICATE OF CORRECTION

PATENT NO. : 6,751,306 B2
DATED : June 15, 2004
INVENTOR(S) : Himmel et al.

It is certified that error appears in the above-identified patent and that said Letters Patent is hereby corrected as shown below:

<u>Column 12,</u>
Line 10, after "33" delete "the A method as described in claim 1" and insert
-- A method --.
Lines 14 and 18, after "the" delete "firs" and insert -- first --.
Line 20, after "a" delete "select" and insert -- selected --.
Line 22, after "set of" insert -- desired --.

Signed and Sealed this

Twenty-seventh Day of December, 2005

JON W. DUDAS
*Director of the United States Patent and Trademark Office*